(12) United States Patent
Patterson

(10) Patent No.: US 7,246,637 B2
(45) Date of Patent: Jul. 24, 2007

(54) BALANCED VALVE

(76) Inventor: Albert W. Patterson, 13417 Colley Road, R.R. #4, West Lorne, Ontario (CA) N0L 2P0

(*) Notice: Subject to any disclaimer, the term of this patent is extended or adjusted under 35 U.S.C. 154(b) by 280 days.

(21) Appl. No.: 11/119,898

(22) Filed: May 3, 2005

(65) Prior Publication Data

US 2006/0249208 A1    Nov. 9, 2006

(51) Int. Cl.
*F16K 3/12* (2006.01)

(52) U.S. Cl. ............... 137/601.02; 137/625.33; 251/195; 251/212

(58) Field of Classification Search ............ 137/625.33, 137/625.34, 625.37, 601.02; 251/282, 326, 251/327, 212, 195
See application file for complete search history.

(56) References Cited

U.S. PATENT DOCUMENTS

| | | | |
|---|---|---|---|
| 38,746 A | 6/1863 | Horell | |
| 285,955 A | 10/1883 | Barry | |
| 1,020,974 A * | 3/1912 | Garbe | 251/327 |
| 1,507,280 A | 9/1924 | Gomand | |
| 1,649,953 A | 11/1927 | Ernst | |
| 1,744,221 A | 1/1930 | Gomand | |
| 2,130,614 A | 9/1938 | Collins et al. | |
| 2,591,274 A * | 4/1952 | Mahoney, Jr. | 137/625.33 |
| 2,669,417 A | 2/1954 | Ray | |
| 2,750,145 A | 6/1956 | Thornros | |
| 4,573,492 A | 3/1986 | Tadokoro | |
| 6,030,174 A | 2/2000 | Maier et al. | |

* cited by examiner

*Primary Examiner*—Stephen M. Hepperle
(74) *Attorney, Agent, or Firm*—Nixon Peabody LLP; Jeffrey L. Costellia

(57) ABSTRACT

A balanced valve for controlling the flow of fluids in conduits, the valve comprising: (a) a casing formed of sidewalls and a casing top and bottom, defining an interior; (b) a fluid inlet in a sidewall of the casing and a fluid outlet in an opposite sidewall of said casing; (c) four similar inner walls positioned in square configuration within the interior and configured to define together with a chamber top and bottom, an enclosed central chamber, each wall having a fluid port of similar size; (d) a fluid channel within the interior of the casing, commencing at the fluid inlet and branching to provide equal flows of fluid to fluid ports in opposite inner walls and a fluid channel extending from the fluid outlet and extending within the interior, branching to provide equal flows of fluid to the fluid ports of a different pair of opposite inner walls; (e) a frame linearly movable within said central chamber between an open and a closed position; and (f) four gates supported in square configuration on said frame, one gate corresponding to each of the fluid ports, the gates constructed and positioned on the frame so that when the frame is in closed position, the gates seal off their corresponding fluid ports to prevent flow of fluid through the fluid channels within the housing, and when it is in open position, the gates are clear of their corresponding fluid ports so as to permit full flow of fluid through the fluid channels.

9 Claims, 5 Drawing Sheets

BALANCED VALVE

FIELD OF THE INVENTION

The present invention relates to a balanced valve for controlling the flow of fluids in conduits.

BACKGROUND OF THE INVENTION

Valves for controlling the flow of fluids such as water and gas in conduits often are subjected to tremendous pressures. For example, if a single wedge valve is used, the valve itself is subjected to both lift and sideways pressure which can create leaks or cause the valve to bind. Such a valve, in a high-pressure environment within a conduit, requires tremendous power to move between open and closed positions.

Known types of valves such as gate valves and butterfly valves are subjected to significant drag forces during operation, particularly in high-pressure environments.

The use of balanced valves, to reduce the drag that otherwise exist on a valve in a conduit is known. The concept is that, by splitting the flow of fluid as it approaches a valve the power required to activate the valve is significantly reduced as is the drag on the valve.

Examples of balanced valves for a wide variety of applications are described and illustrated in U.S. Pat. No. 38,746 of Horell, issued Jun. 8, 1863; U.S. Pat. No. 285,955 of Barry, issued Oct. 2, 1883; U.S. Pat. No. 1,507,280 of Gomand, issued Sep. 2, 1924; U.S. Pat. No. 1,649,953 of Ernst, issue Nov. 22, 1927; U.S. Pat. No. 1,744,221 of Gomand, issued Jan. 21, 1930; U.S. Pat. No. 2,130,614 to Collins et al., issued Sep. 20, 1938; U.S. Pat. No. 2,669,417 to Ray, issued Feb. 16, 1954; U.S. Pat. No. 2,750,145 of Thornros, issued Jun. 12, 1956; U.S. Pat. No. 4,573,492 of Tadokoro, issued Mar. 4, 1986 and U.S. Pat. No. 6,030,174 of Maier et al., issued Feb. 29, 2000. These patents teach various types of valve constructions where fluid flow is equally diverted from a single conduit to pairs of conduits, the valves controlling the flow of fluid through these two conduits.

It is an object of the present invention to provide a novel construction of balanced valve which will have a variety of applications and provide effective sealing and operation at high pressures.

SUMMARY OF THE INVENTION

In accordance with the present invention there is provided a balanced valve for controlling the flow of fluids in conduits. The valve comprises a casing formed of sidewalls and a casing top and bottom, defining an interior. A fluid inlet is provided in a sidewall of the casing and a fluid outlet in an opposite sidewall of the casing. Four similar inner walls are positioned in square configuration within the interior and configured to define, together with a chamber top and bottom, an enclosed central chamber. Each wall has a fluid port of similar size. A fluid channel within the interior of the casing is provided, commencing at the fluid inlet and branching to provide equal flows of fluid to the fluid ports in opposite inner walls. Another fluid channel extends from the fluid outlet and extends within the interior, branching to provide equal flows of fluid to the fluid ports of a different pair of opposite inner walls. A frame is linearly movable within the central chamber between an open and a closed position. Four gates are supported in square configuration on the frame, one gate corresponding to each of the fluid ports, the gates constructed and positioned on the frame so that when the frame is in closed position, the gates seal off their corresponding fluid ports to prevent flow of fluid through the fluid channels within the housing, and when it is in open position, the gates are clear of their corresponding fluid ports so as to permit full flow of fluid through the fluid channels.

The balanced valve according to the present invention permits a tight seal when in closed position, and opens with minimum power. Its construction, by providing a fully balanced valve gate arrangement on four sides, prevents twists and distortion that is often a problem with prior art valve constructions, when the valves are subjected to high pressures. The valve has many different applications including in hydraulics for machines and engines, and as valves for fire hose pumps.

BRIEF DESCRIPTION OF THE DRAWINGS

These and other objects and advantages of the invention will become apparent upon reading the following detailed description and upon referring to the drawings in which.

Figure 1:
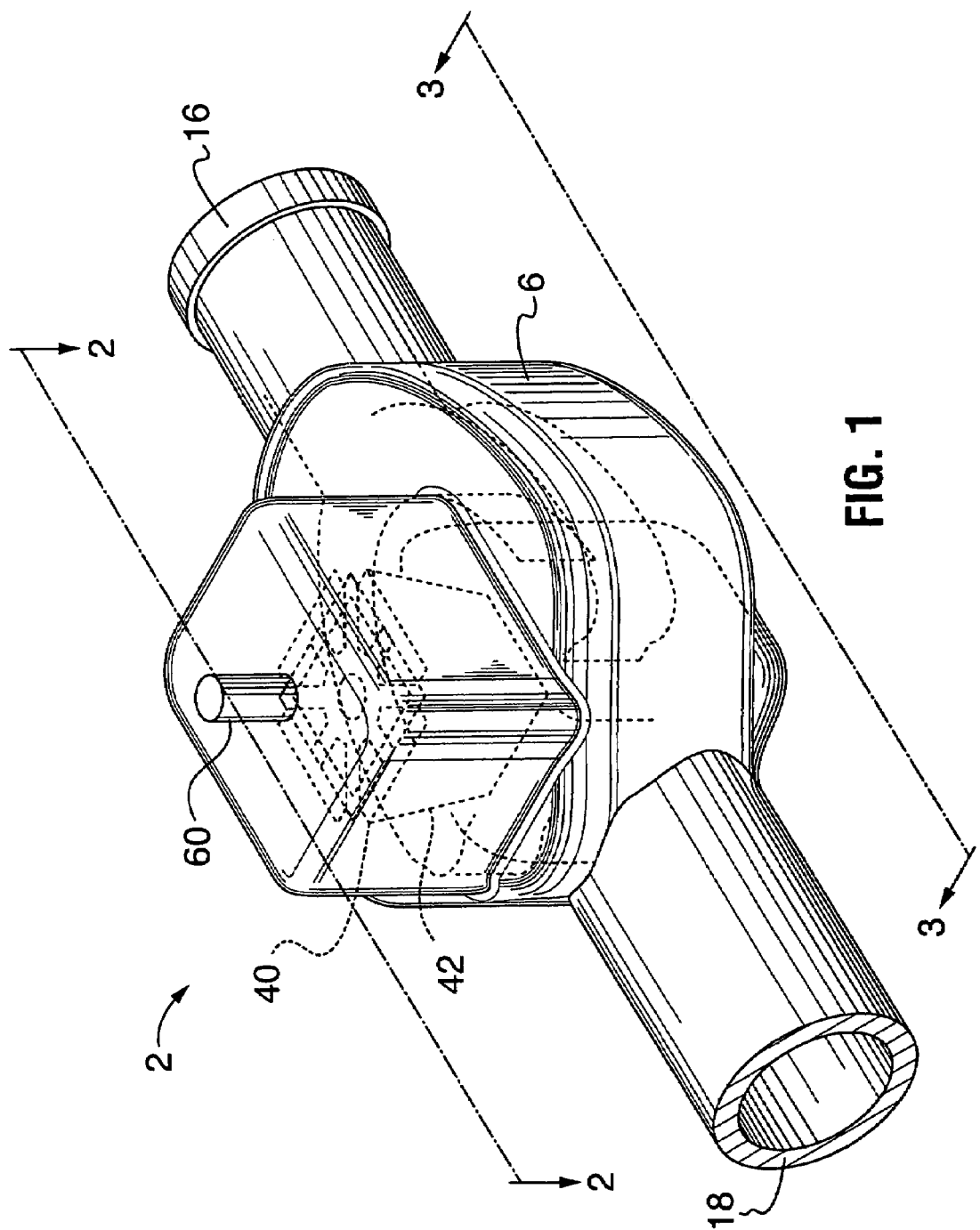
FIG. 1 is a perspective view of a balanced valve according to the present invention.

While the invention has been described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE DRAWINGS

In the following description, similar features in the drawings have been given similar reference numerals.

Figure 2:
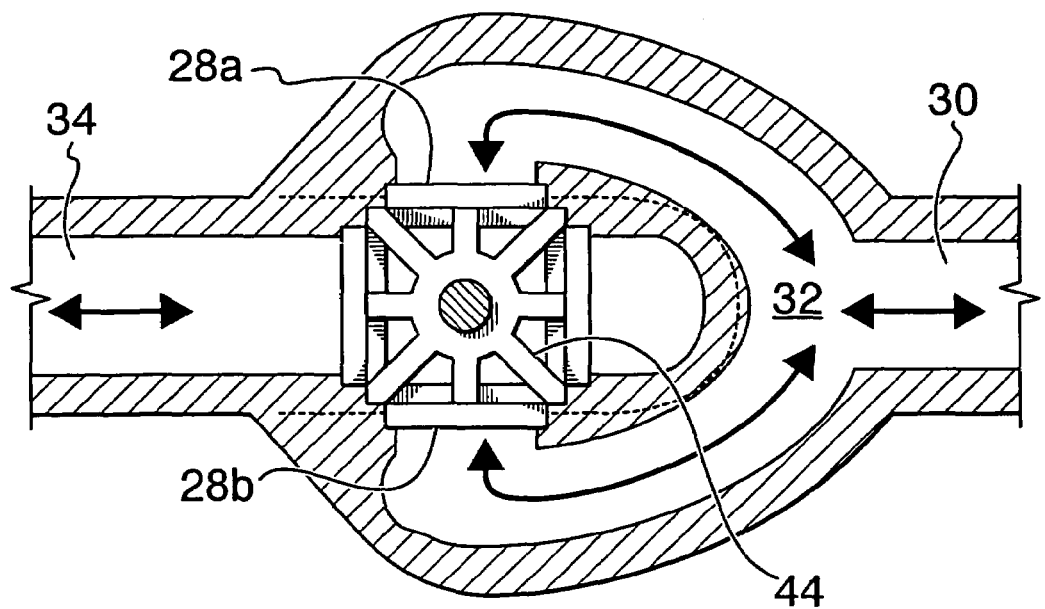
FIG. 2 is a section view of the valve of FIG. 1 along line 2-2.
Figure 3:
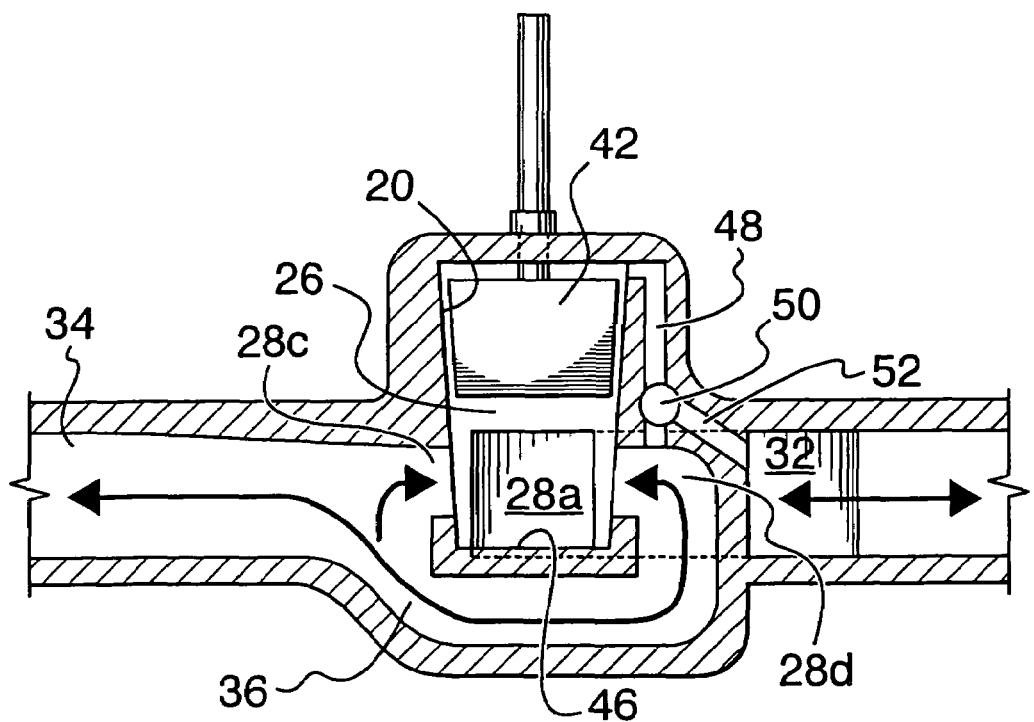
FIG. 3 is a section view of the valve of FIG. 1 along line 3-3.
Figure 4:
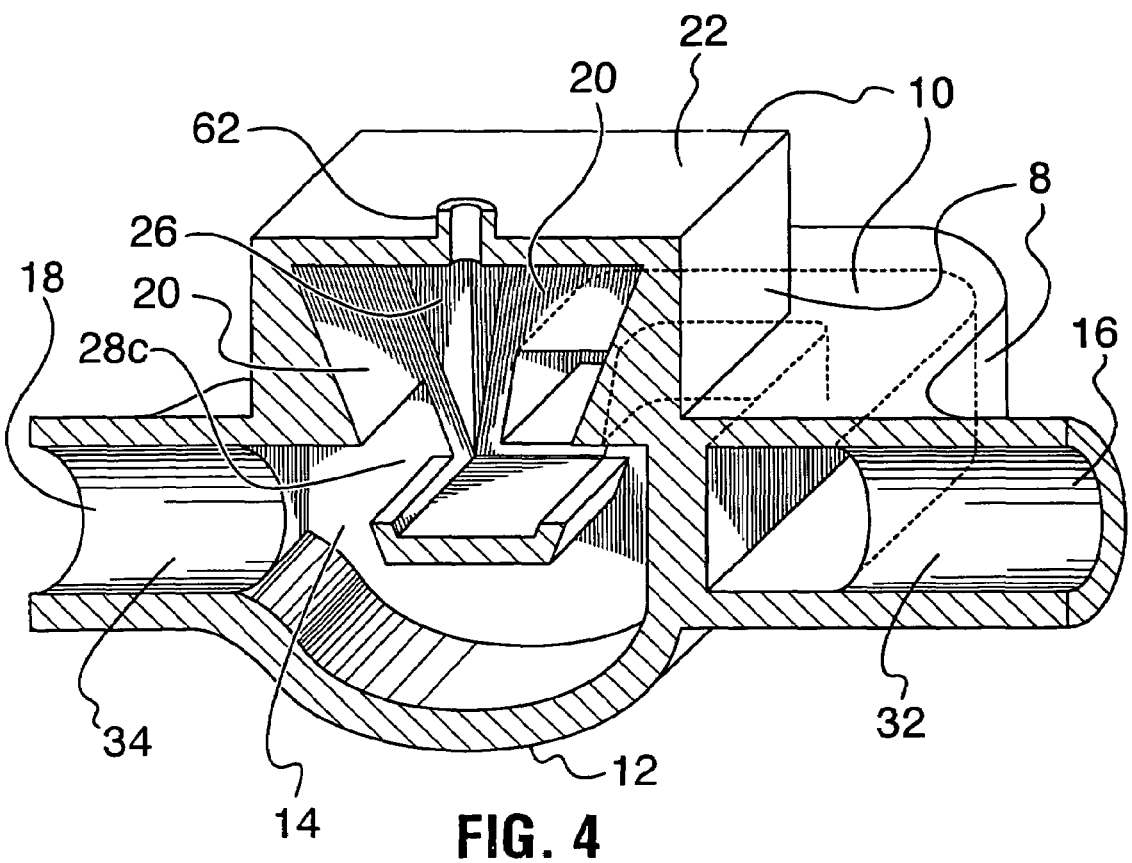
FIG. 4 is a side view of the housing of the valve of FIG. 1, partially broken away to show its interior.

Turning to FIGS. 1 to 5, there is illustrated a balanced valve 2 for controlling the flow of fluids in a conduit. The valve comprises a casing 6 formed of sidewalls 8 and a casing top 10 and casing bottom 12, all of which define a casing interior 14 (FIG. 4). A fluid inlet 16 (which may alternatively serve as a fluid outlet) is provided in a sidewall 8 of the casing 6, and a fluid outlet 18 (which may alternatively serve as a fluid inlet) is provided in an opposite sidewall of the casing.

Four similar inner walls 20 are positioned in square configuration (FIG. 5) within that interior and are configured to define, together with a chamber top 22 and chamber bottom 24, an enclosed central chamber 26. Each wall 20 has a fluid port 28 of similar size.

As can be seen in the section view of FIG. 2, a fluid channel 30 is provided within the interior 14 of casing 6, commencing at the fluid inlet 16 and branching at 32 to provide equal flows of fluid to opposed fluid ports 28a and 28b.

A second fluid channel 34 (FIG. 3) extends from fluid outlet 18, within chamber 26, branching at 36 to provide equal flows of fluid to fluid ports 28c and 28d on a different pair of opposite inner walls 20. Channels 32 and 24 are separate and independent from each other and do not communicate with each other, other than through chamber 26.

A frame 40 (FIG. 5) is situated within chamber 26, linearly moveable within that chamber between an open position (phantom, FIG. 3) and a closed position (full line, FIG. 3).

Four gates 42, of similar size and shape, are constructed and positioned on frame 40 in square configuration, as illustrated (FIGS. 2 and 5), one gate 42 corresponding to each of the fluid ports 28, the gates 42 positioned on the frame 40 so that when the frame 40 is in closed position, the gates 42 seal off their corresponding fluid ports 28 to prevent flow of fluid through the fluid channels within the housing. When the frame 40 is in open position, the gates 42 are clear of their corresponding fluid ports 40 so as to permit full flow of fluid through the fluid channels, from fluid inlet 16 through chamber 26, and out outlet 18. The gates 42 and frame 40 may be of integral construction.

Figure 5:
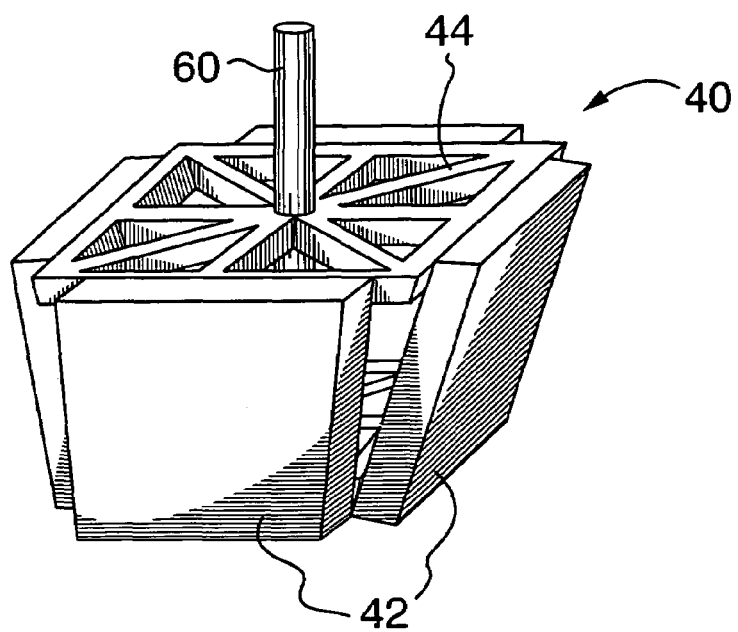
FIG. 5 is a perspective view of the frame and valve gate arrangement in accordance with the present invention.

As can be seen in FIGS. 3 and 5, the opposed pairs of gates 42 are angled away from each other, from bottom to top. This angle is from about 10% to 30%. This angle is preferably about 90% to the direction of flow in and out of chamber 26 through ports 28 and, as will be explained in more detail subsequently, creates a displacement pressure from the fluid flow on the gates 42. This pressure on the outside of the inlet gates creates a force which assists in opening the gates. The equal pressure on the inside of the outlet gates pushing closed will balance this force. By angling opposing gates 42 accordingly, and having the opposed walls 20 of the inner chamber 26 similarly angled with respect to each other, a slow bleed of fluid through fluid ports 28 is accomplished as the gates 42 are begun to be moved from closed to open position. The gates and walls fit flushly, when in closed position, as illustrated FIG. 3.

Frame 40 is comprised of a number of spaced trusses 44 (FIG. 5) providing open access for fluid within chamber 26, during operation of the valve, to flow between these gates. These trusses distribute the fluid pressure from outside of gates 42, pushing in on the two inlet gates 42 to the center, balancing this pressure between the gates. These trusses also distribute to the center the pressure from inside pushing out on the surface of the outlet gates 42, balancing this pressure between both outlet gates.

As can be seen for example in FIG. 3, gates 42 extend below the fluid ports 28, when the frame 40 and gates 42 are in a closed position. As well, chamber bottom 24 is formed with a depression 46 into which the bottoms of gates 42 fit when the frame 40 and gates 42 are in this closed position. When the frame is commenced to be moved to open position, the flow of fluid initially is directed through this depression 46, providing a means of automatically flushing solid impurities from the fluid which may have collected at the bottom of chamber 26 during operation of the device.

As can be seen in FIG. 3, a bleed channel 48 may be provided in a wall 20 of chamber 26, to provide fluid communication between fluid channel 34 and the interior of chamber 26. A further bleed channel 52 may be provided, communicating with fluid channel 30 and bleed channel 48 and the interior of chamber 26, that communication being controlled by valve 50.

As can be seen schematically in FIG. 6, in an alternative embodiment of the balanced valve according to the present invention, an independent bleed channel 54 may be provided in a wall 20 of chamber 26, to provide fluid communication between channel 30 and the interior of chamber 26. This bleed channel 54 provides a small flow bypass, in conjunction with control valve 56, from the high pressure fluid supply through conduit 30 to the inside of the chamber 26. This bypass flow is used to create greater pressure on the inside of the outlet gates 42, causing final closing and sealing of the gates against outlet and inlet openings in the casing. Also bleed channel 48 provides a small flow bypass with control valve 58, from the inside of the chamber 26 to the low pressure outlet line of conduit 34. By opening this bypass flow through bleed channel 48, a drop of pressure is permitted inside the closed chamber 26 causing lower pressure on the inside of outlet gates 42 then that on the outside of inlet gates 42, causing the displacement pressure to unseal and crack open valve 2, facilitating its opening. In this embodiment, valves 56 and 58 respectively control the passage of fluid through bleed channels 54 and 48. In other words, these bleed channels provide bypasses around the gates 42 and fluid ports 28 when the frame and gates are in closed position, to assist in the opening and closing of gates 42 during operation of valve 2.

Control of valve 2, to open and close gates 42, is accomplished by any conventional means. For example, in the illustrated embodiment, a rod 60 is centrally disposed on frame 40, the rod being slidably seated in an aperture 62 (FIG. 4) in the top 22 of chamber 26 (which also serves as top 10 of casing 6 in the illustrated embodiment). This rod is centered on trusses 44 and not only helps to control movement of frame 40 and gates 42 but also assists in keeping gates 42 centered when opening and closing.

Figure 6A:
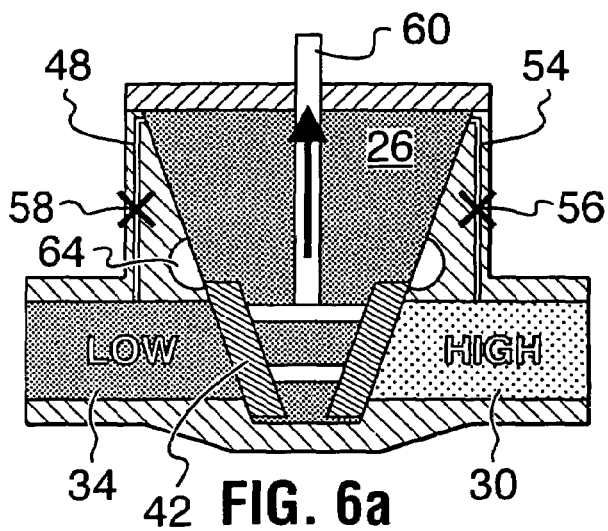
FIGS. 6a, 6b, 6c and 6d are schematic section views of an example embodiment of valve construction according to the present invention, illustrating a sequence of conditions of the valve.
Figure 6B:
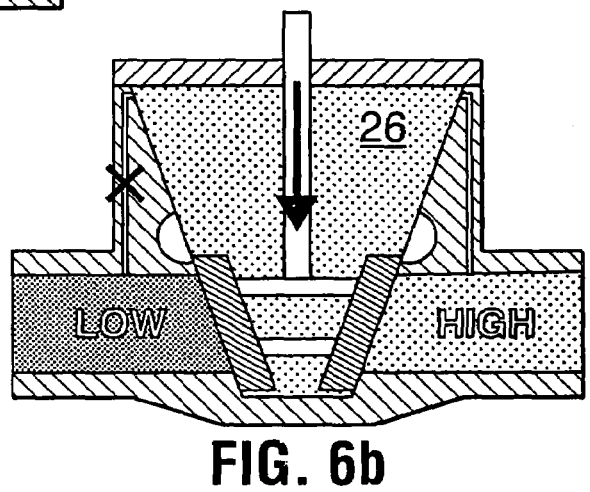
Figure 6C:
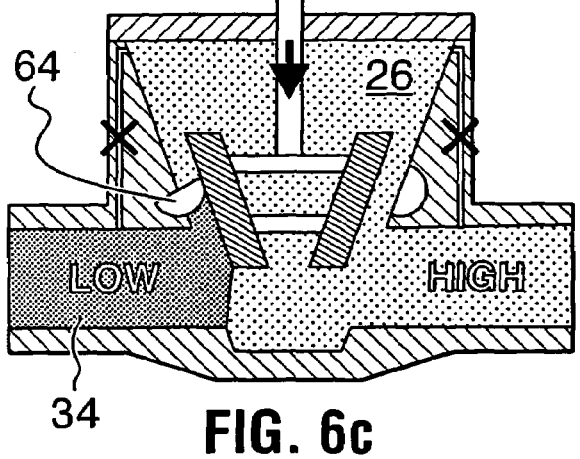
Figure 6D:
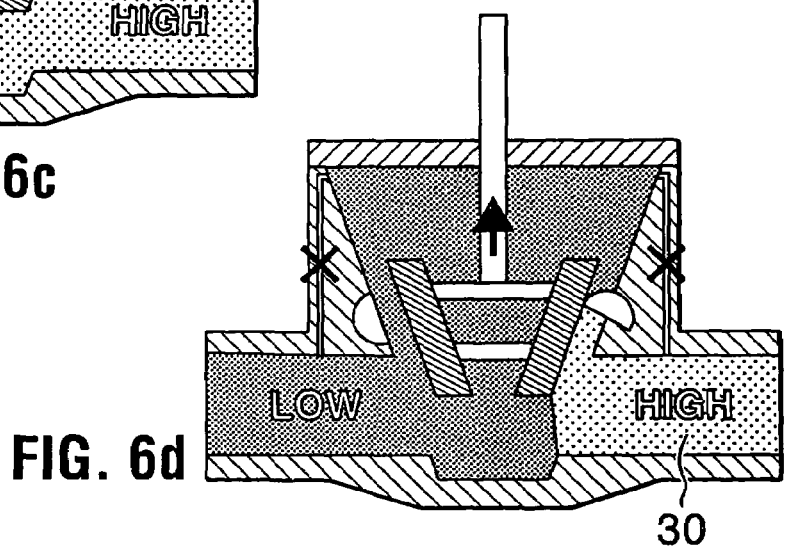

As can be seen in FIGS. 6a to 6d, in one embodiment of the balanced valve 2 according to the present invention, a series of externally actuated deflectors 64 are provided in the walls 20 of chamber 26, so as to provide, when actuated, progressive obstruction to the flow of fluid through the associated fluid port 28, the deflectors providing an obstruction to fluid flowing between the gates 42 and adjacent chamber walls 20, as the frame 40 and gates 42 approach closed position or commence to move from closed position to open position. This control, together with that accomplished by the use of bleed channels 56 and 58, significantly enhances the operation of valve 2. For instance, in FIG. 6a, gates 42 are in closed position with the high pressure fluid being backed up and held in conduit 30. By opening valve 56 of bleed channel 54, fluid under high pressure is passed into chamber 26 providing high pressure within that chamber and assisting, because of the angle of gates 42, the forced closing of gates 42. In this condition, valve 58 of downstream bleed channel 48, feeding to exit conduit 34, is closed. In FIG. 6c, as gates 42 are being closed, the downstream deflector 64 may be opened to slow down the flow of fluid under high pressure from chamber 26, into conduit 34. This will assist in the closing of gates 42, by increasing the pressure within chamber 26. In FIG. 6d, with the upstream deflector 62 being activated, as gates 42 are being opened, higher pressure is maintained on the fluid in conduit 30, than is in chamber 26. This fact, together with the angle of gates 42, permits easier opening of gates 42 within chamber 26.

Figure 7A:
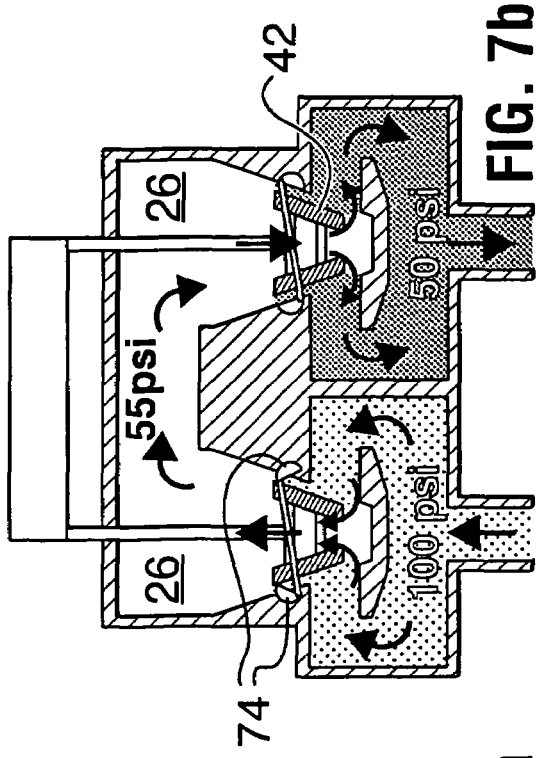
FIGS. 7a, 7b, 7c and 7d are schematic section views of different control conditions in an alternative embodiment of balanced valve in accordance with the present invention.
Figure 7B:
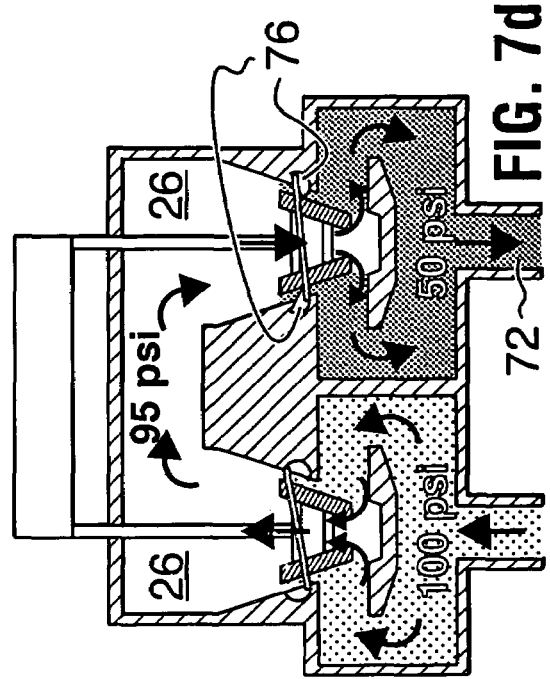
Figure 7C:
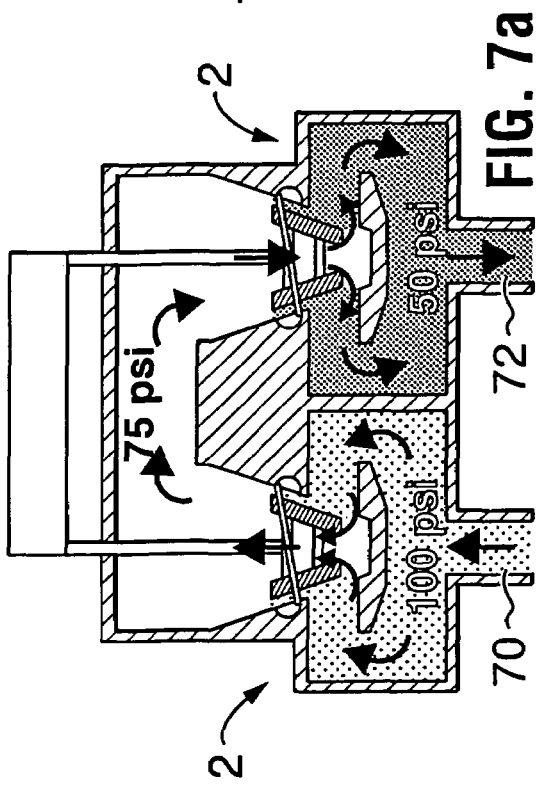
Figure 7D:
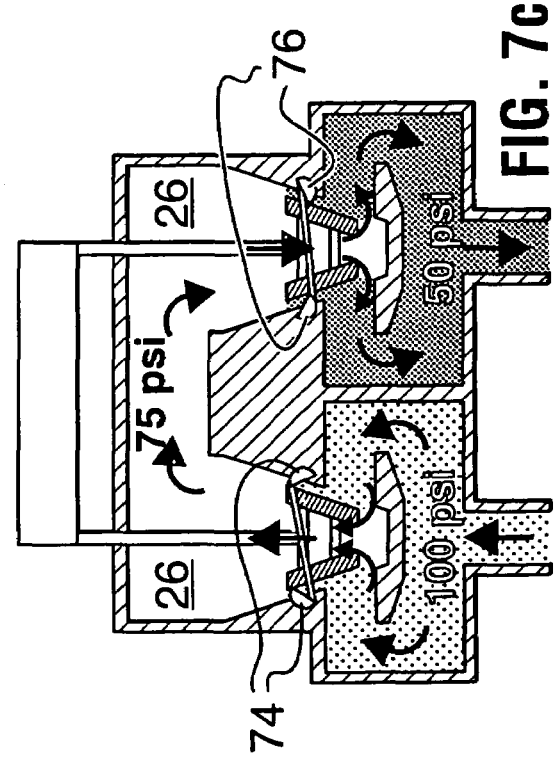

In FIGS. 7a, 7b, 7c and 7d, an example alternative arrangement of balanced valves 2 in accordance with the present invention is schematically illustrated. The valves are arranged in series so that fluid passes from inlet conduit 70 through the left hand valve 2, under higher pressure, and then passes through the right hand valve 2, and through outlet conduit 72. For example the pressure differential between the fluid entering through conduit 70 might be 100 psi and that of the fluid leaving through conduit 72 is 50 psi, with a pressure in chambers 26 being 75 psi (FIG. 7a). If deflectors 74 are activated as frame 40 and gates 42 are raised (FIG. 7b), the pressure within chambers 26 of the two valves is reduced (say to 55 psi), assisting in the opening of gates 42. If both deflectors 74 and 76 are activated (FIG. 7c), then the pressure differential in chambers 26 of valves 2 is normalized (say back to 75 psi as in FIG. 7a). If only deflectors 76, of the right hand valve 2 are activated, then fluid flow into outlet conduit 72, from chambers 26, is obstructed, increasing the pressure within those chambers (say to 95 psi), thereby facilitating the closing of gates 42.

Thus, as can be seen in FIGS. 6a to 6d and 7a to 7d, the deflectors control pressure changes within the chamber or chambers 26 of valve or valves 2, to balance or cause differential pressure to facilitate in the moving of gates 42 into open or closed position. The square configuration of chamber 26 and gates 42 stops gates 42 from twisting, and keeps them in line with fluid ports 28.

Thus, it is apparent that there has been provided in accordance with the invention a balanced valve that fully satisfies the objects, aims and advantages set forth above. While the invention has been described in conjunction with specific embodiments thereof, it is evident that many alternatives, modifications and variations will be apparent to those skilled in the art in light of the foregoing description. For example, valve 2 can serve as a governor or mixing chamber by increasing an equal number of inlets 16 and outlets 18. Accordingly, it is intended to embrace all such alternatives, modifications and variations as fall within the spirit and broad scope of the invention.

The embodiments of the invention in which an exclusive property or privilege is claimed are defined as follow:

1. A balanced valve for controlling the flow of fluids in conduits, the valve comprising:
   (a) a casing formed of sidewalls and a casing top and bottom, defining an interior;
   (b) a fluid inlet in a sidewall of the casing and a fluid outlet in an opposite sidewall of said casing;
   (c) four similar inner walls positioned in square configuration within the interior and configured to define together with a chamber top and bottom, an enclosed central chamber, each wall having a fluid port of similar size;
   (d) a fluid channel within the interior of the casing, commencing at the fluid inlet and branching to provide equal flows of fluid to fluid ports in opposite inner walls and a fluid channel extending from the fluid outlet and so extending within the interior, branching to provide equal flows of fluid to the fluid ports of a different pair of opposite inner walls;
   (e) a frame linearly movable within said central chamber between an open and a closed position; and
   (f) four gates supported in square configuration on said frame, one gate corresponding to each of the fluid ports, the gates constructed and positioned on the frame so that when the frame is in closed position, the gates seal off their corresponding fluid ports to prevent flow of fluid through the fluid channels within the housing, and when it is in open position, the gates are clear of their corresponding fluid ports so as to permit full flow of fluid through the fluid channels.

2. A valve according to claim 1, wherein opposite gates on the frame are angled outwardly, away from each other, from bottom to top.

3. A valve according to claim 2, wherein opposite gates are angled from about 2% to about 10% away from each other, from bottom to top.

4. A valve according to claim 1, further provided with narrow bleed channels communicating between the fluid channels and the central chamber, to provide a bypass around the gates and fluid ports when the frame and gates are in closed position, the bleed channels provided with externally actuated control means, as required, selectively to prevent or permit the flow of fluid through them.

5. A valve according to claim 1, wherein the frame is comprised of trusses extending between opposite gates, the trusses permitting fluid communication from the chamber between the gates.

6. A valve according to claim 5, wherein a rod is centrally disposed on the frame, the rod slidably seated in an aperture in the top of the housing, the rod constructed so as to control the linear movement of the frame and gates.

7. A valve according to claim 1, wherein the gates extend below the ports when the frame is in closed position into a depression forming in the chamber bottom.

8. A valve according to claim 1, wherein the chamber walls are provided with deflectors externally actuated to restrict fluid flow into and from the chamber between the gates and the ports by obstructing the passage of fluid between the walls of the chamber and the gates when the frame and gates have been moved from the closed position.

9. A balanced valve for controlling the flow of fluids in conduits, the valve comprising:
   (a) a casing formed of sidewalls and a casing top and bottom, defining an interior;
   (b) a fluid inlet in a sidewall of the casing and a fluid outlet in an opposite sidewall of said casing;
   (c) four similar inner walls positioned in square configuration within the interior and configured to define together with a chamber top and bottom, an enclosed central chamber, each wall having a fluid port of similar size;
   (d) a fluid channel within the interior of the casing, commencing at the fluid inlet and branching to provide equal flows of fluid to fluid ports in opposite inner walls and a fluid channel extending from the fluid outlet and extending within the interior, branching to provide equal flows of fluid to the fluid ports of a different pair of opposite inner walls;
   (e) a frame linearly movable within said central chamber between an open and a closed position;
   (f) four gates supported in square configuration on said frame, one gate corresponding to each of the fluid ports, the gates constructed and positioned on the frame so that when the frame is in closed position, the gates seal off their corresponding fluid ports to prevent flow of fluid through the fluid channels within the housing, and when it is in open position, the gates are clear of their corresponding fluid ports so as to permit full flow of fluid through the fluid channels;
   opposite gates on the frame being angled outwardly, away from each other, from bottom to top, and
   narrow bleed channels communicating between the fluid channels and the central chamber, to provide a bypass around the gates and fluid ports when the frame and gates are in closed position, the bleed channels provided with externally actuated control means, as required, selectively to prevent or permit the flow of fluid through them and the chamber walls being provided with deflectors externally independently actuable to restrict fluid flow between the gates and the ports by obstructing the passage of fluid between the walls of the chamber and the gates when the frame and gates have been moved from the in closed position.

* * * * *